United States Patent
Miles

(10) Patent No.: US 8,197,318 B2
(45) Date of Patent: Jun. 12, 2012

(54) SPORTS OFFICIATING SIMULATOR

(76) Inventor: Jacques Miles, New York, NY (US)

( * ) Notice: Subject to any disclaimer, the term of this patent is extended or adjusted under 35 U.S.C. 154(b) by 91 days.

(21) Appl. No.: 12/443,976

(22) PCT Filed: Nov. 10, 2006

(86) PCT No.: PCT/IB2006/003176
§ 371 (c)(1),
(2), (4) Date: Nov. 17, 2009

(87) PCT Pub. No.: WO2007/054805
PCT Pub. Date: May 18, 2007

(65) Prior Publication Data
US 2010/0087238 A1    Apr. 8, 2010

(51) Int. Cl.
G06F 17/00    (2006.01)

(52) U.S. Cl. .......................................................... 463/9
(58) Field of Classification Search ............... 463/4, 5, 463/9; 273/317.1, 317.2, 317.3, 317.4, 317.5, 273/317.6
See application file for complete search history.

(56) References Cited

U.S. PATENT DOCUMENTS

| 5,882,204 A * | 3/1999 | Iannazo et al. ........... 434/251 |
| 7,951,045 B1 * | 5/2011 | Brader ............................ 482/3 |
| 2006/0116185 A1 * | 6/2006 | Krull .............................. 463/4 |
| 2006/0281061 A1 * | 12/2006 | Hightower et al. ...... 434/247 |

* cited by examiner

Primary Examiner — Ronald Laneau

(57) ABSTRACT

A method for simulating the experience of a sports official is disclosed. The method includes the steps of (a) displaying game content over a medium and (b) receiving a first input signal while the game content is being displayed which stops the content from being displayed.

12 Claims, 1 Drawing Sheet

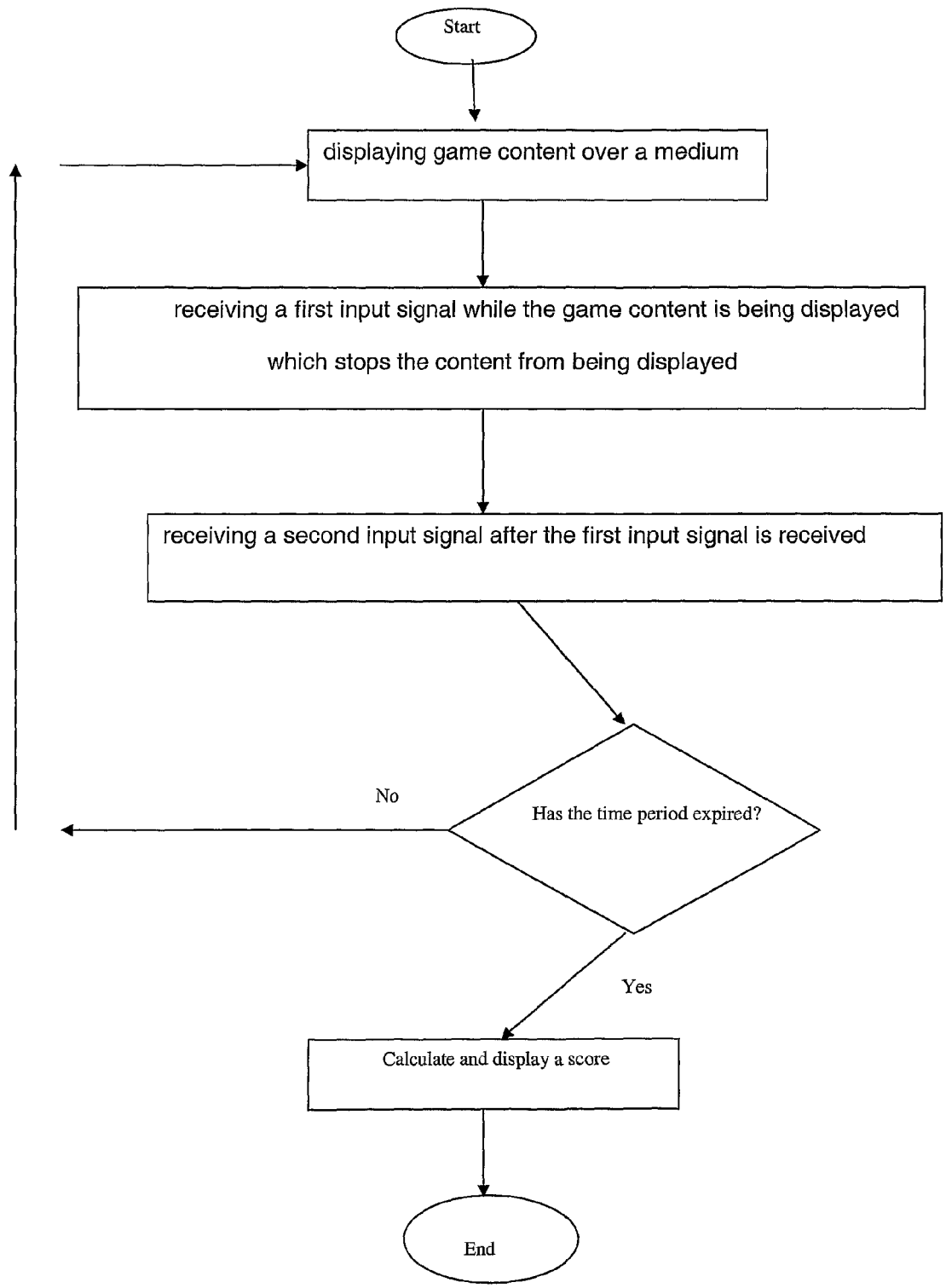

SPORTS OFFICIATING SIMULATOR

FIELD OF THE INVENTION

The present invention relates to a method of simulating and related devices, especially methods that involve simulating the experience of a sports official.

BACKGROUND

Every sport is governed by its own set of rules. During a sporting contest, one or more persons called officials administer the game by enforcing rules. Every level of sport—little league, middle school, high school, college, semi-pro, professional—require officials for the games to be played safely and properly. The officials who officiate our beloved games come from every segment of society and have varied knowledge, abilities, skills and experience.

During a game, regardless of the sport, it is not rare for a spectator to wish an official(s) working a particular game was doing a better job; making less mistakes and administering the game in a more efficient manner. The level of frustration experienced by a spectator is especially high if the official(s) blows an important call and/or influences the outcome of the game. Sometimes an official(s) performs so poorly that the spectators believe they can do a better job of officiating than the official(s) who are trained and get paid to officiate.

The uneven, and sometimes outright poor, performance of an official(s) as observed by spectators can be at least partly attributed to the way officials learn their craft. The conventional way for an official to learn his/her craft is through study of the appropriate rules along with trial and error experience gained by officiating actual games. Because there are only so many games per season for an official to officiate, the learning curve for a new official is difficult and it takes a long time for a new official to gain proficiency.

In light of the limited number of actual games played per season for an official in a particular sport to practice his/her technique and gain proficiency, there is clearly demand for a method of simulating the experience of a sports official that will enable a person to gain competence officiating a particular sport by training under game-like situations; seeing and then identifying penalties in real games. The present invention provides such a method. The present invention provides a method for sports officials to increase their level of skill by simulating the situations and conditions they encounter during actual games. By increasing the competence level of sports officials, the present invention enhances the overall experience of the sports we love. The present invention also provides an entertaining and educational experience for non-officials.

SUMMARY OF THE INVENTION

It is an object of the present invention to provide a method which enables officials and those who want to become officials to develop and/or improve officiating skills without having to officiate an actual game.

It is an object of the present invention to provide a method for learning the rules of a particular sport; such method is particularly useful for persons who have had no or limited exposure to a particular sport but desire to learn more about the particular sport and how it is played.

BRIEF DESCRIPTION OF THE DRAWINGS

FIG. 1 shows a flowchart representing one, non-limiting embodiment of the present invention.

DESCRIPTION OF THE INVENTION

As used herein, the term "official" refers to a person who administers a game and enforces the rules during the game (i.e., a football game, a basketball game, a baseball game, a hockey game, a soccer game, a boxing match, a rugby match, etc.). Terms such as "referee", "umpire", "head linesman", etc. are considered to be synonymous with the term official.

As used herein, the term "penalty" refers to a violation of a particular rule in a given sport. Terms such as "infraction", "foul", etc. are considered to be synonymous with the term penalty.

As used herein, the term "personal computing device" refers to a computer or other device having a processor and memory capable of performing the method of the invention. The term personal computing device encompasses various models made by manufactures such as Dell computer, Gateway computer, Apple, etc. and includes video game consoles such as the X-Box from Microsoft, the Playstation from Sony, PSP from Sony, the Gameboy system from Nintendo, etc. Another example of a suitable personal computing device is a television set having a set top box or TiVo.

As used herein, the term "displaying" encompasses video, graphics, and/or audio content. Video content can be displayed on a medium such as a television screen, a computer screen, etc. Audio content can be displayed over a medium such as one or more speakers. Audio content can be displayed simultaneously with video content.

The present invention is a method for simulating the experience of a sports official comprising (a) displaying game content over a medium; (b) receiving a first signal that pauses the display; (c) re-starting the display of game content; and repeating steps (b) and (c).

According to the present invention, the method of the present invention involves displaying game content over a medium. The medium can be a visual medium such as a screen (i.e., computer screen, television screen, etc.); an audible medium such as loudspeakers; a combination of visual medium and an audible medium; etc. In a non-limiting embodiment of the invention, the game content is recorded from a previously played sporting event. The game content can be from any sport including, but not limited, to a football game, a basketball game, a baseball game, a hockey game, a soccer game, a boxing match, a tennis match, etc. The game content can be from any level of sport including little league, high school, college, or professional.

It is envisioned that the game content will be provided by a sports league such as the National Basketball Association, National Football Association, National Baseball League, National Hockey League, U.S. Soccer League or by a collegiate association such as the National Association of Intercollegiate Athletics.

In a non-limiting embodiment of the invention, the sporting event from which the game content originates has been filmed using various camera angles. For example, game content from a football game has been filmed from a camera(s) in one or more endzones (i.e., endzone camera angle), from a camera(s) on one or more sidelines (i.e., sideline camera angle), from a camera(s) over the stadium (i.e., overhead camera angle), etc. Thus, in this embodiment, the camera angle of visually displayed game content can be changed to give a person viewing the game content (a person viewing the game content or using the invention is referred to as a "user" herein) a different vantage point. The visual display of game content is not restricted to the view from any particular camera angle.

In a non-limiting embodiment of the invention, the camera angle of the visually displayed game content can be changed while the method of the invention is being practiced. For example, the camera angle of the visually displayed content can be changed upon receiving a "camera angle shifting signal".

The following scenario is included for illustrative purposes. If the present invention is being practiced and the game content being visually displayed is from a sideline camera angle, a camera angle shifting signal can be received to change the camera angle of the visually displayed content. For example, the game content being visually displayed is from a side line camera angle, and a camera angle shifting signal is received to change the visual display of game content to an endzone camera angle.

When the game content originates from a sporting event that has been played at some point in the past, the original content contains footage of and relating to the officials who worked the event. If the officials at the original sporting event are visible and/or there is evidence of their participation present during the display of game content step of the present invention, the impact of the present invention might be reduced. Therefore, in a non-limiting embodiment of the invention, the game content of the invention is edited before it is displayed in a manner such that the presence of officials at the original sporting contest and any evidence of their administering rules at that sporting contest which would negatively impact the practice of the present invention is deleted. In this embodiment, penalties committed during the actual game and related activities (i.e., throwing a flag, blowing a whistle, enforcement of a penalty, etc.) are edited out of the game content and are not apparent/detectable when the game content is displayed.

In another non-limiting embodiment of the invention, the game content is edited in a manner that enhances the simulation of a sports officiating experience. For example, portions of the scene can be digitally enhanced to sharpen the video images or increase the scale of the video content (i.e., make players in the video content appear larger and make their movements more well defined).

According to the present invention, game content for display can be stored and/or accessed in a number of ways. In a non-limiting embodiment of the invention, game content is transmitted from a server or similar device via the Internet or other to a personal computing device which implements the method of the invention. The server or similar device can be at the same location as the personal computing device or a location remote from the personal computing device. In this embodiment, game content is transmitted from the server or other and received by the personal computing device using methods which are well known in the art.

There are many ways in the art to transmit and receive digital and analog signals. An example of a suitable data transmission system for the transmission and receipt of game content is the on-demand system used by cable operators like Comcast. Another example of a suitable method is described in U.S. Pat. No. 5,130,792 assigned to USA Video Inc. (Dallas, Tex.).

In the embodiment described above, the game content can be displayed immediately upon receipt by the personal computing device or it can be stored in a conventional manner for future display.

In another non-limiting embodiment of the invention, game content is stored on a personal computing device. For example, game content is stored on a hard drive or similar. The game content can originate from a server, disc or any other device and then be transferred and stored on the personal computing device.

A subscription payment model or a fee per download model can be used to authorize access to a server or similar device and regulate the transmission of game content from the server/device. Internet based subscription systems are such as those utilized by major league baseball to gain access to proprietary content are well known in the art.

In another non-limiting embodiment of the invention, game content is stored on a digital video disc (DVD) or similar storage device. A personal computing device or other can be used to read the DVD and display the game content.

In yet another non-limiting embodiment of the invention, the game content is stored on a conventional digital video recorder (DVR) which store video content in digital form. A personal computing device or other can communicate with the DVR and display the game content. An example of a DVR system is described in U.S. Pat. No. 6,674,960 assigned to Forgent Networks, Inc. (Austin, Tex.).

According to the present invention, while the game content is being displayed, a first input signal is received from a first input device. Upon receipt of the first input signal, the display of the game content is stopped or paused. The first input signal is received and transmitted using methods which are well known in the art. In the practice of the present invention, the first input signal is typically used to indicate a penalty has been observed.

The first input device can be a keyboard, joystick, or other similar device as is well known in the art. In a non-limiting embodiment of the invention, the first input device is a whistle or other device capable of making sound.

In the practice of the invention, the various input and output devices referred to herein can be connected using various input/output connectors and ports which are well known in the art. The various input/output devices can communicate with the personal computing device by any suitable means such as, but not limited to, a wireless system such as "Bluetooth", cable, etc.

In a non-limiting embodiment of the invention, after the first input signal is received, a second input signal is received. The second input signal is generated by a second input device. The second input signal is received and transmitted using methods which are well known in the art.

The second input device can be a keyboard, joystick, or other similar device. The second input device can be the same device as the first input device or a different device.

In the practice of the invention, the second input signal is typically used to indicate a specific infraction that has been observed. The term "specific infraction" refers to information such as, but not limited to, the type of infraction committed, who (which player) committed the infraction, etc. For example, in a football game, the type of infraction can be holding, clipping, grabbing a facemask, roughing the passer, being offsides, etc. For example, in a basketball game, the type of infraction can be double dribble, a blocking foul, a charge, traveling, etc.

In a non-limiting embodiment of the invention, the second input device is sensor capable of detecting and interpreting movement. For example, the sensor can detect and interpret particular body movements. If a person were to perform the body movement associated with a holding penalty in football, for example, the sensor would interpret the movement as such and send the appropriate signal to the personal computing device.

After the first input signal, and optionally, the second input signal is received, the display of the game content is resumed. Ideally, the display of game content resumes at the next point in the game that enables a smooth transition from where the first input signal was received (i.e., a penalty was observed).

The display of game content continues until another first input signal is received or the time period for the display of game content expires.

The time period for the display of game content is typically determined before the game content is initially displayed. In a non-limiting embodiment of the invention, the time period is 5 minutes, 10 minutes, 20 minutes, 30 minutes, etc. The time period can be the entire length (i.e., from the start to the finish) of a game. There is no limitation on the time period for display of the game content.

In a non-limiting embodiment of the invention, a score is calculated after the time period for display of the game content expires. The score can be based on an evaluation of the first input signals or the first and the second input signals. Because the first and second input signals represent the penalties called during the relevant time period by a user, that information can be evaluated against a control indicative of the actual penalties (i.e., the penalties determined to be present by an authoritative person or body as opposed to those observed by the user) committed in the game content displayed over the relevant time period. The score can be indicative of a user's level of competence to officiate a particular sport.

In a non-limiting embodiment of the invention, the computed score is displayed on the screen and/or audibly conveyed.

In a non-limiting embodiment of the invention, a score is generated based on (a) a number of "correct calls"; (b) a number of "incorrect calls"; and/or (c) a number of "improper calls" during a specified time period. As used herein, a correct call is a penalty that was called properly. For a correct call, two conditions must be present: (1) a penalty did occur in the displayed game content when (approximately) a first input signal was received and (2) the penalty was properly identified (a holding penalty was identified as a holding penalty; not a facemask penalty, for example). An incorrect call refers to the situation where a penalty did not occur approximately when the first input signal was received.

The following illustrates a correct call, an incorrect call and an improper call. References to a penalty that actually occurred in the displayed content and the specifics of the penalty refer to the judgment of the authoritative person or body mentioned above.

In this example, the displayed game content is from a football game and shows a holding penalty. A first input signal is received approximately when the holding penalty occurs. Thus, the first condition for a correct call is satisfied. A penalty did occur approximately when the first input signal was received.

Next, a second input signal is received that indicates the penalty observed was a holding penalty. Because the penalty was properly identified, both conditions for a correct call have been satisfied in this instance. If the second input signal had not indicated that a holding penalty was observed, both requirements for a correct call would not have been present.

If a penalty had not occurred in the displayed content approximately when the first input signal was received, this situation would represent an incorrect call. A penalty did not occur approximately when the first input signal was received.

As used herein, an improper call refers to the situation when the first condition (i.e., a penalty did occur approximately when the first input signal was received) for a correct call is satisfied, but the second condition (i.e., the proper identification of the infraction) is not. Had the second input signal been indicative of an illegal motion penalty as opposed to a holding penalty, the call would have been an improper call.

In a non-limiting embodiment of the invention, the displayed game content can be rewound and redisplayed. The rewinding and redisplaying of the game content can be accomplished using means which are well known in the art.

In a non-limiting embodiment of the invention, a database or similar containing the rules of a particular sport (referred to herein, as a "rules database") can be accessed by the personal computing device, and a specific rule(s) searched and displayed over the medium. The rules can be displayed in various formats such as words, multimedia frames, etc. Techniques for searching content in a database or similar are well known in the art. An example of a suitable system for storing and searching information is a server archive-based editing and research system referred to in the industry as the SABER system. The rules database can be stored and/or accessed in a similar manner to the game content.

The rules database can contain various rules. In a non-limiting embodiment, the rules database contains the rules of the National Football Association. In another embodiment, the rules database contains the rules of the Virginia High School Football Athletic Association. In yet another embodiment, the rules database contains the rules of the National Basketball Association.

In a non-limiting embodiment of the invention, a database or similar containing mechanics (mechanics database) to communicate penalties can accessed by the personal computing device, and a specific mechanic(s) can be searched and displayed over the medium. The mechanics can be displayed in various formats such as words, multimedia frames, etc. For example, the database or similar can contain video content illustrating the proper mechanic for calls according to the National Football League. The mechanics database can be stored and/or accessed in a similar manner to the game content.

In a non-limiting embodiment of the invention, a database or similar containing educational modules can accessed by the personal computing device, and a specific educational module (s) can be searched and displayed over the medium. The educational modules can be displayed in various formats such as words, multimedia frames, etc. The educational module database can be stored and/or accessed in a similar manner to the game content.

In a non-limiting embodiment of the invention, information about officiating chapters can be accessed by the personal computing device and displayed over the medium. In this embodiment, the database or similar of sports officiating chapters for various sports across the nation and/or globe will be searchable. Based on user information such as zip code or other, contact information can be displayed for a sports officiating chapter in the desired area. In this manner, persons who use the present invention and demonstrate a proficiency to officiate a particular sport can be directed to local sports officiating organization in his/her area.

In actual practice, the method of the present invention will be implemented using a personal computing device. The method of the invention will performed on a personal computer or similar using one or more software programs or similar. The software program(s) can be written on a DVD or other programmable device as in known in the art so that it can be read and actuated by a personal computing device or other. The practice of this invention is not limited to any particular computing platform such as a personal computer using a Windows operating system, a Sony PSP, a Microsoft X Box, a Nintendo gameboy, etc. The present invention can be practiced on any platform.

According to the present invention, the processing (transmitting, receiving, etc.) of the various input and output signals described above is accomplished using methods which are well known in the art.

The personal computing device utilized to practice the present invention can contain one or more video and/or graphic systems including components for receiving compressed and uncompressed graphics and video and for processing the received graphics and video into displayable format. The graphic display system can be any one capable of processing video input signals that may include analog video signals, digital video signals, etc. The analog signals can be, for example, NTSC, PAL and SECAM signals or any other conventional type of analog signal. The digital signals can be decoded MPEG signals or other format of digital video output.

Suitable methods for processing audio and video signals are well known in the art. A suitable method is described in U.S. Pat. No. 6,728,312 assigned to Forgent Networks, Inc. (Austin, Tex.).

We will now illustrate the practice of the invention when the game content is from a football game. In the practice of the invention, game content is displayed on at least one screen. The game content is from a previously recorded football game, but the original football game content has been edited in a manner such that there is no sign or indication of the officials who administered the actual game while the game content is being displayed. At some point during the display of the game content, a first input signal is received by the personal computing device. The game content is then paused or stopped.

The first input signal indicates a penalty has been observed. A second input signal is then received that indicates the specific infraction observed. For example, the second input signal can indicate one of the following infractions occurred: a holding penalty, a clip, an illegal procedure, a facemask, etc.

After the second input signal is received, the display of game content resumes at a place after which the first input signal was received which enables a smooth transition. The display of game content continues until another first input signal is received or the time period for display expires. At the expiration of the time period, a score can be calculated and displayed.

If another input signal is received before the time period for display of the game content expires, the sequence described above from the first input signal is repeated.

We will now illustrate the practice of the invention when the game content is from a basketball game. In the practice of the invention, game content is displayed. The game content is from a previously recorded basketball game, but the original basketball game content has been edited in a manner such that there is no sign or indication of the officials who administered the actual game while the game content is being displayed. At some point during the display of the game content, a first input signal is received. The game content is then paused or stopped.

The first input signal indicates a penalty has been observed. A second input signal is then received that indicates the specific infraction observed. For example, the second input signal can indicate one of the following infractions occurred: a double dribble, a traveling violation, a blocking foul, a charge, etc.

After the second input signal is received, the display of game content resumes at a place after which the first input signal was received which enables a smooth transition. The display of game content continues until another first input signal is received or the time period for display expires. At the expiration of the time period, a score can be calculated and displayed.

If another first input signal is received before the time period expires for the displayed game content, the sequence described above from the first input signal is repeated.

The method of the present invention can be used as a simulator/training tool for sports officials at all levels and aspiring sports officials. The present invention also provides sports officials and aspiring sports officials an opportunity to test their knowledge and administration of the rules of a particular sport. The method of the invention can also be used to educate someone who is not knowledgeable about a particular sport to the rules of that sport and possibly develop a lifelong fan.

It will be readily appreciated by those skilled in the art that modifications may be made to the invention without departing from the concepts disclosed in the foregoing description. Such modifications are to be considered as included within the scope of the invention. Accordingly, the particular embodiments described in detail hereinabove are illustrative only and are not limiting as to the scope of the invention, which is to be given the full breadth of the appended claims and any and all equivalents thereof.

I claim:

1. A method for simulating the experience of a sports official comprising (a) displaying game content comprising recorded content from a previously played sporting event which has been edited in a manner such that the presence of any officials at the actual game has been deleted over a medium; (b) receiving a first input signal which indicates a penalty has been observed while the game content is being displayed which stops the game content from being displayed; (c) repeating steps (a) and (b) until a time period expires; and (d) calculating a score based on the first input signals which represent penalties observed in the displayed content during the time period, whereby the method is accomplished via a computing system.

2. The method according to claim 1 wherein the game content is from a football game, a basketball game, a baseball game, a hockey game, or a soccer game.

3. The method according to claim 1 wherein the displaying, receiving and repeating steps are accomplished using a personal computing device.

4. The method according to claim 1 wherein the first input signal is transmitted from a first input device.

5. The method according to claim 1 further comprising (c) receiving a second input signal after the first input signal is received.

6. The method according to claim 5 wherein the second input signal is transmitted from a second input device.

7. The method according to claim 1 wherein the game content is displayed at a certain viewing angle that can be changed while the content is being displayed.

8. The method according to claim 1, wherein the displayed game content is transmitted from a server or similar device via the internet or other to a personal computing device.

9. The method according to claim 1 further comprising searching for and displaying a rule(s).

10. The method according to claim 1 further comprising searching for and displaying a mechanic.

11. The method according to claim 1 further comprising searching for and displaying an educational module.

12. A method for simulating the experience of a sports official comprising (a) displaying game content comprising recorded content from a previously played sporting event which has been edited in a manner such that the presence of any officials at the actual game has been deleted over a medium; (b) receiving a first input signal while the game content is being displayed which stops the game content from being displayed; (c) receiving a second input signal after the first input signal is received; (d) repeating steps (a), (b) and (c) until a time period expires; and (e) calculating a score based on the first and second input signals which represent penalties observed in the displayed content during the time period, whereby the method is accomplished via a computing system.

* * * * *